No. 662,295. Patented Nov. 20, 1900.
F. C. OLTROGGE.
VENTILATING COVER FOR SHIPPING OR STORAGE VESSELS.
(Application filed June 23, 1900.)
(No Model.)

UNITED STATES PATENT OFFICE.

FREDERICK C. OLTROGGE, OF TRIPOLI, IOWA.

VENTILATING-COVER FOR SHIPPING OR STORAGE VESSELS.

SPECIFICATION forming part of Letters Patent No. 662,295, dated November 20, 1900.

Application filed June 23, 1900. Serial No. 21,302. (No model.)

*To all whom it may concern:*

Be it known that I, FREDERICK C. OLTROGGE, a citizen of the United States, residing at Tripoli, in the county of Bremer and State of Iowa, have invented certain new and useful Improvements in Ventilating-Covers for Shipping and Storage Vessels; and I do declare the following to be a full, clear, and exact description of the invention, such as will enable others skilled in the art to which it appertains to make and use the same.

The invention relates to a ventilating-cover for shipping and storage vessels, and more particularly to a cover for milk-cans.

The object of the invention is to provide a cover of this character by means of which the contents of the vessel may be ventilated, while at the same time they will be shielded from exposure to dust-laden air and to rain. With this object in view the invention consists in certain features of construction and combination of parts which will be hereinafter fully set forth.

Figure 1:
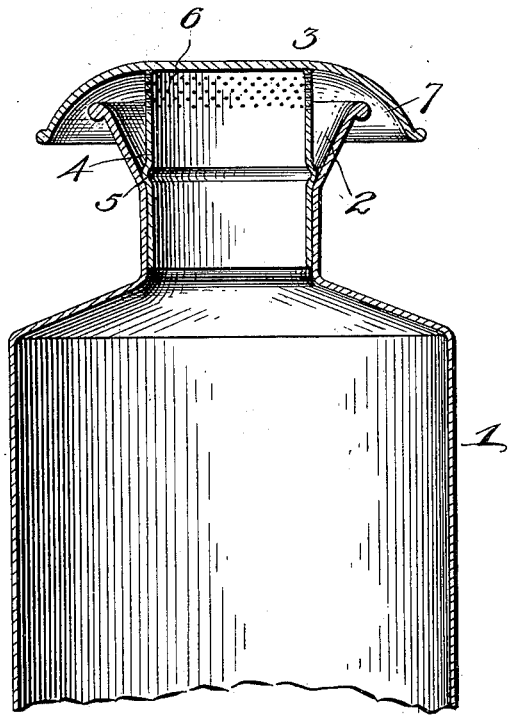
Figure 2:
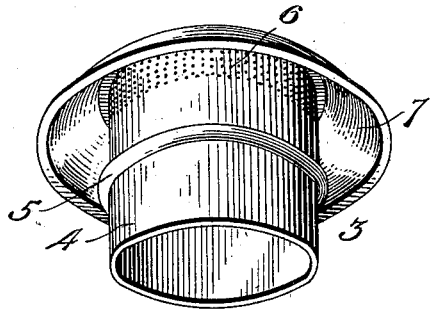

In the accompanying drawings, Figure 1 is a vertical sectional view through a milk-can illustrating the application of my invention, and Fig. 2 is a detail perspective view of the cover.

In the drawings, 1 denotes the vessel, which in the present instance is shown as a milk-can, the upper end of which is flared outwardly, as shown at 2.

3 denotes the cover, which consists of the neck portion 4, having pressed therein a stop-bead 5, adapted to abut against the flaring portion 2 of the can and limit the depth of insertion of the cover within the can. The upper end of the neck portion of the cover is formed with minute perforations 6.

Secured to the neck at its extreme upper end is a downwardly and outwardly flaring hood or shield 7, which projects downwardly below the perforated portion of the neck and prevents dust-laden air from entering the can from above and also rain.

A vessel provided with a cover of this character enables its contents to be thoroughly ventilated.

From the foregoing description, taken in connection with the accompanying drawings, the construction, operation, and advantages of my invention will be readily understood without requiring an extended explanation. The device is exceedingly useful for the purpose for which it is designed and may be placed upon the market at a comparatively small cost.

Having thus fully described my invention, what I claim as new, and desire to secure by Letters Patent of the United States, is—

The combination with a vessel having an outwardly-flaring discharge end, of a cover consisting of a tubular portion having a stop to limit its insertion into the discharge end of the vessel and provided at its upper end with vent-perforations, several of which are surrounded by the flaring discharge end of the vessel and others of which are located above the discharge end of the vessel, and a shield or guard secured to the extreme upper end of said tubular portion and flaring outwardly and downwardly and having its edge in a plane below the discharge end of the vessel, substantially as set forth.

In testimony whereof I have hereunto set my hand in presence of two subscribing witnesses.

FREDERICK C. OLTROGGE.

Witnesses:
JNO. H. MUELLER,
E. H. MARTIN.